United States Patent [19]

Kimberlin

[11] Patent Number: 4,739,208

[45] Date of Patent: Apr. 19, 1988

[54] BRUSH ASSEMBLY INCLUDING BRUSH WEAR DETECTOR

[75] Inventor: Dan W. Kimberlin, Erie, Pa.

[73] Assignee: General Electric Company, Salem, Va.

[21] Appl. No.: 930,285

[22] Filed: Nov. 13, 1986

[51] Int. Cl.⁴ .................................... H02K 5/14

[52] U.S. Cl. .................................... 310/242; 310/245; 310/247; 310/248; 200/61.4; 335/153

[58] Field of Search ................ 310/229, 230, 239-242, 310/244-249; 200/61.4; 318/361, 542; 335/153, 205

[56] References Cited

U.S. PATENT DOCUMENTS

| | | | |
|---|---|---|---|
| 2,691,114 | 10/1954 | Lykins | 200/61.4 |
| 3,068,333 | 12/1962 | Hewitt, Jr. | 335/153 |
| 3,292,121 | 12/1966 | Bergstrasser | 335/153 |
| 4,213,110 | 7/1980 | Holce | 335/153 |
| 4,214,220 | 7/1980 | Queen | 335/153 |
| 4,348,608 | 9/1982 | Michael | 310/242 |
| 4,456,897 | 6/1984 | Holce et al. | 335/205 |
| 4,488,078 | 12/1984 | Orton | 310/242 |
| 4,567,414 | 1/1986 | Berings | 318/361 |

FOREIGN PATENT DOCUMENTS

| | | | |
|---|---|---|---|
| 2487114 | 1/1984 | France | 335/205 |
| 1120140 | 7/1968 | United Kingdom | 335/205 |
| 2092390 | 8/1982 | United Kingdom . | |
| 0466566 | 5/1973 | U.S.S.R. | 335/153 |

*Primary Examiner*—R. Skudy

*Attorney, Agent, or Firm*—Arnold E. Renner

[57] ABSTRACT

A brush wear detector and indicator for the brush elements contacting the rotating commutator or slip rings of a dynamoelectric machine includes, in addition to a self winding bias spring located on the brush holder for applying force to the brush assembly, a permanent magnet, located either on a brush element or the bias spring, and a reed switch located on the brush holder adjacent the assembly. The magnet moves inwardly as the brush element wears and actuates the read switch at a point indicative of a worn condition. Activation of the reed switch causes an indicator such as a lamp to become energized, signalling a need for brush element replacement.

20 Claims, 2 Drawing Sheets

FIG. 5
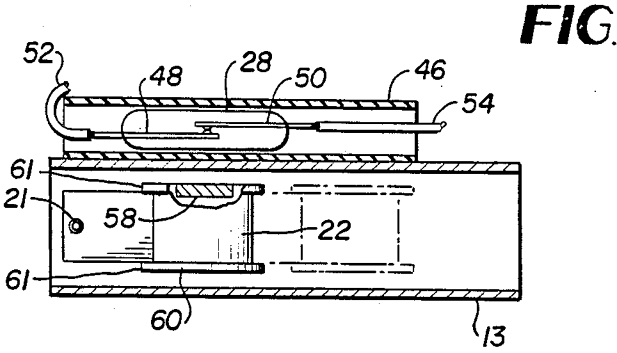
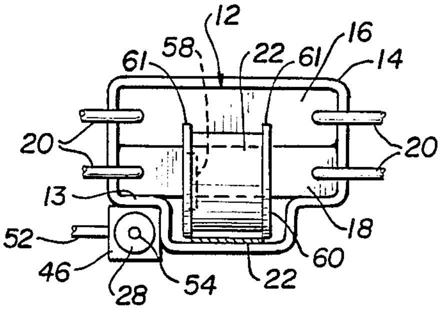
FIG. 6
FIG. 7A
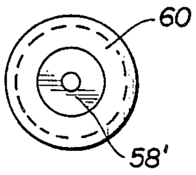
FIG. 7B
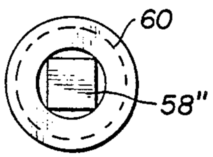
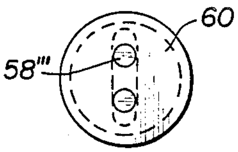
FIG. 7C
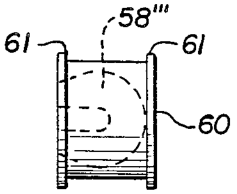
FIG. 7D

BRUSH ASSEMBLY INCLUDING BRUSH WEAR DETECTOR

BACKGROUND OF THE INVENTION

1. Field of the Invention

This invention relates generally to a brush assembly including a brush wear detector for use on a dynamoelectric machine and more particularly to a magnetic type brush wear detector which energizes an indicating signalling circuit.

2. Description of the Prior Art

Rotating electrical machinery, and more particularly direct current motors, include a stator and a rotating armature having a commutator which is electrically coupled to an external electric circuit through one or more brushes which contact the commutator. As the commutator rotates, the contact surfaces of the brushes wear down to the point where replacement is required to prevent damage to the commutator and to ensure efficient power transfer.

Brush wear detectors are well known and generally comprise various types of mechanical and electrical circuit arrangements which act to signal the fact that the brush has been worn away to a length at which replacement is required. One known typical example comprises a brush wear detector having a self winding biasing spring mounted on the brush holder which operates to urge the brush inwardly against a rotating slip ring or commutator of an electrical machine. The winding action of the spring is used as an actuator for electrical circuit means which operates to energize a visual type of indicator. An example of such apparatus is shown and described in U.S. Pat. No. 4,488,078, entitled, "Brush Wear Detector", which issued to Ronald C. Orton, on Dec. 11, 1984, and which is also assigned to the present assignee.

Another example of brush wear detector includes a read switch mounted at the bottom of the brush holder and a pair of cylindrical magnets disposed within holes formed (e.g., drilled) in the brush itself. When the brush wears sufficiently, the magnets approach the reed switch, activating that switch to effect a signal indicating a worn brush condition. This arrangement requires modification to standard brush which can present difficulties during field replacement and is not practical in those situations where a large number (e.g., up to ten) of individual brush elements are included in the same brush box or holder.

It is an object of the present invention, therefore, to provide an improvement in brush wear detectors for use with dynamoelectric machines.

It is another object of the invention to provide a brush wear detector for use with brush holder assemblies of electrical machinery such as direct current motors.

A further object of the invention is to provide a brush wear detector which is inexpensive to fabricate but nevertheless operates in a reliable and efficient manner.

And still another object of the invention is to provide a brush wear detector which overcomes certain disadvantages inherent in known prior art apparatus for detecting brush wear.

An additional object is to provide a brush assembly including a brush wear detector which readily permits replacement in the field using, basically, standard brush elements.

SUMMARY OF THE INVENTION

The foregoing and other objects are achieved by a brush assembly including a brush wear detector for detecting a worn brush in electrical machinery such as direct current (D.C.) motors. The assembly includes a self winding biasing spring located on a brush box or holder containing one or more brushes contacting a rotating power transfer element such as a commutator. In a first embodiment, a permanent magnet is secured to the brush by means of a clip and translates within the brush box as the brush wears during use. At a predetermined position corresponding to a worn condition of the brush, the permanent magnet actuates a magnetic reed switch attached to the brush holder. Upon actuation of the reed switch, an indicator circuit is energized. In a second embodiment, the self winding bias spring winds about an insulating spool containing a permanent magnet which also translates a function of brush wear and upon reaching a predetermined location, indicative of a worn condition, also actuates a read switch located on the brush holder to energize an indicator which may be, for example, an electrical light type indicator.

BRIEF DESCRIPTION OF THE DRAWING

While the present invention is defined in the claims annexed to and forming a part of the specification, a better understanding can be had by reference to the following description taken in conjunction with the accompanying drawings in which:

FIG. 5 is a partial top planar view of the embodiment shown in FIG. 4;

FIG. 6 is an end planar view of the embodiment shown in FIG. 4;

FIGS. 7A through 7C are side planar views of three different shapes of magnets includable in the spring spool element shown in FIG. 4; and FIG. 7D is a central longitudinal cross sectional view of FIG. 7C.

DESCRIPTION OF THE PREFERRED EMBODIMENTS

Figure 1:
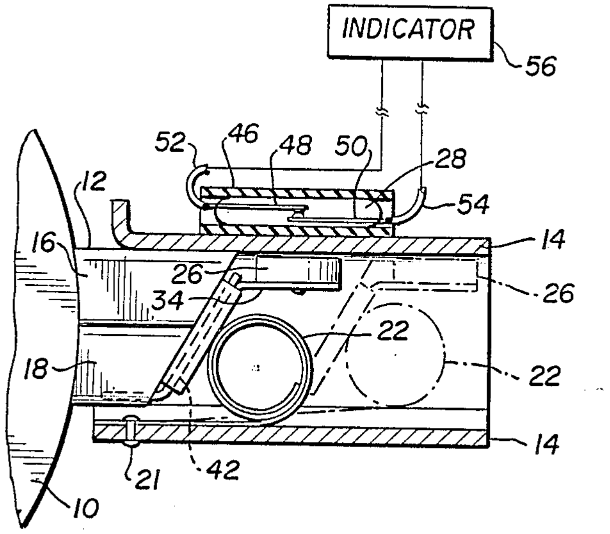
FIG. 1 is a schematic side elevation, partly in cross section, illustrating a brush wear detector according to a first embodiment of the invention.
Figure 2:
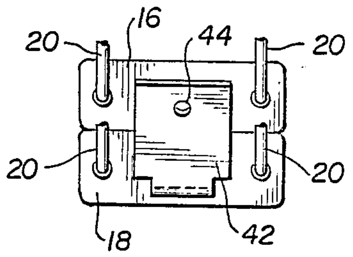
FIG. 2 is a top planar view illustrative of a brush included in the embodiment shown in FIG. 1 and including a mounting element for a magnet.
Figure 3:
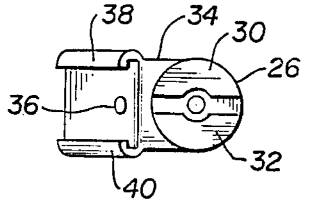
FIG. 3 is a top planar view illustrative of a permanent magnet located on a clip for the mounting element shown in FIG. 2.

Referring now to the drawings and more particularly to FIGS. 1, 2 and 3, which are illustrative of the first embodiment of the invention, reference numeral 10 denotes, for example, a fragmentary portion of a commutator of a direct current (D.C.) motor (or generator), not shown. Element 10 could also represent a slip ring on an alternating current (A.C.) machine. The commutator, however, is the most common application for the present invention. As is well known, such a motor is comprised of two main elements, a stator assembly and a rotor assembly. The commatator 10 forms part of the rotor assembly. Power transfer to the rotor is accomplished by means of a brush assembly 12 which is in slidable contact with the commutator 10. The brush assembly, moreover, is contained within a brush holder or box 14 which is secured to the stator assembly of the motor. The brush assembly 12 is typically comprised of one or more, for example as shown, pairs of brush elements 16 and 18 which are arranged in side by side relationship within the brush holder 14. One or more electrical leads 20 are embedded in the brush elements 16 and 18 as shown in FIG. 2 to provide connection to an external power source or electrical circuit, not shown.

The brush assembly 12 is urged inwardly by the force applied from a self winding bias spring 22, having a prestressed volute coil portion, which is secured to the brush holder 14 by a suitable fastening means such as rivet 21. As the brush elements 16 and 18 wear due to the frictional contact with the commutator 10, the rear end of the brush assembly moves from the phantom position as shown in FIG. 1 to an inward position, whereupon the spring rolls into a coil as shown.

A wear detector for the brush configuration shown in FIG. 1 is comprised of a planar circular permanent magnet 26, as shown in FIG. 3, which is used to actuate and close a reed switch 28. The magnet 26 consists of a two pole magnet having top and bottom portions 30 and 32. The circular magnet 26 is secured to an angulated clip member 34 having a detent 36 formed on a body portion including a pair of opposing curved side portions 38 and 40 which are adapted to engage the side edges of a mounting plate 42. The mounting plate 42 is secured to the brush assembly 12 as by being embedded in the brush element 18. The mounting plate 42, moreover, includes a detent hole 44 which engages the detent element 36 of the clip 34.

As shown in FIG. 1, the magnet 26 thus mounted on the plate 42 is adapted to move toward the commutator 10 as the brush assembly wears down during use.

The reed switch 28, moreover, is located in an insulated retainer tube 46 which is secured to the brush holder 14. The reed switch 28 is positioned within the tube 46 such that when a worn brush position is reached, the circular magnet 26 operates to bring the two reed switch contacts 48 and 50 together as shown in FIG. 1. The two switch contacts 48 and 50 are respectively connected to a pair of insulated electrical leads 52 and 54 which couple to a brush wear indicator 56 which may be comprised of, for example, an electric lamp which is energized when the reed switch is closed under the influence of the magnet 26. Thus, in operation the bias spring 22 operates to move the magnet 26 into position adjacent the reed switch 28 when a predetermined brush position is reached. At this point a signal is generated indicating the need for brush replacement.

In this first embodiment, that brush element within which the mounting plate 42 is embedded will, of course, be special. Any other elements, however, may be of the "standard" type, thus facilitating replacement in field service. When, as earlier indicated, a number of brush elements (e.g., up to ten) are included in a single holder, considerable savings can still be effected utilizing this embodiment of the present invention.

The second embodiment of the invention also involves magnetic actuation of a reed switch to cause an indicator circuit to be energized. This embodiment is depicted schematically in FIGS. 4, 5 and 6.

Figure 4:
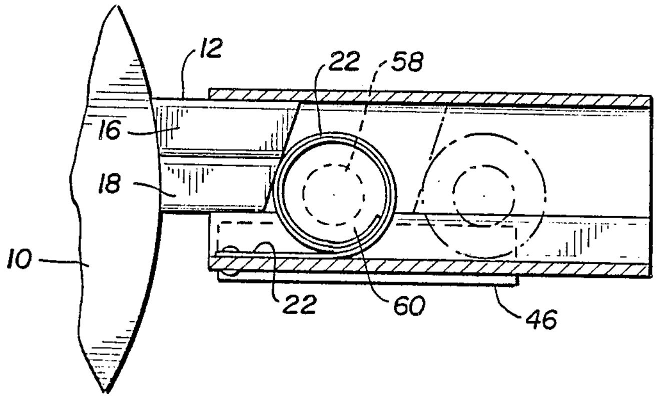
FIG. 4 is a schematic side elevational view, partly in cross section, of a second embodiment of the invention.

Referring now to these figures, the commutator 10 and brush assembly 12 including the two brush elements 16 and 18 as shown in FIG. 4, are the same as that depicted in FIG. 1. Also, there is a self winding bias spring 22 which contacts the rear end surfaces of the brush assembly 12. FIG. 6 furthermore is illustrative of the cross sectional shape of the brush holder 14 which includes an indented side region for accommodating the reed switch 28 and its retainer tube 46 along the surface 13 thereof. This is a very desirable feature in applications which employ multiple brush box assemblies at a single station. This location constitutes a shift in position by 90 degrees from that shown in FIG. 1 due to the fact that now a two pole permanent magnet 58 is embedded in an insulating spool 60 around which the bias spring 22 winds as the brush assembly 12 wears down due to the frictional contact with the commutator 10. As a consequence, the axis of polarity of the magnet 58 is generally coaxial with the eye of the spring's coil. Flanges 61 on the spool 60 act to provide a two point pressure on the brush assembly 12 and thus greater brush stability is provided.

FIGS. 4 and 5 further depict the operation of the device in that the phantom lines thereof disclose the position of the spool 60 and magnet 58 when a new set of brushes 16 and 18 are installed.

FIG. 5 furthermore shows the location of the reed switch 28 and more particularly the two contacts 48 and 50 thereof at a position, selected to be the worn brush position, so that as the bias spring 22 moves inwardly towards the commutator 10 during brush wear, the magnet 58 will traverse to a position adjacent the contacts 48 and 50 in a manner similar to that shown in FIG. 1, whereupon the contacts close and the indicator 56 is enabled to provide a signal indicative of a worn brush condition.

While the structure of the permanent magnet 58 as shown in FIGS. 4–6 as being comprised of a generally solid circular member, FIGS. 7A, 7B and 7C are illustrative of other magnet shapes that may be employed when desired. For example, magnet 58′ shown in FIG. 7A comprises an annular magnet member, whereas the magnet 58″ shown in FIG. 7B comprises a magnet having a generally square cross section. With respect to the magnet shown in FIG. 7C, it comprises a small horseshoe type magnet 58‴ which is further shown in FIG. 7D.

Since in the second basic embodiment the magnetic structure is affixed to the bias spring, it is clear that the brush elements may be of the standard type to thus gain the full advantages of the present invention.

Thus what has been shown and described is a relatively inexpensive means of detecting a worn brush condition in a dynamoelectric machine wherein a permanent magnet is moved by the brush bias spring to a point indicative of a worn brush position where it then actuates a reed switch, causing a worn brush signal to be generated.

Having thus shown and described what are at present considered to be the preferred embodiments of the invention, it should be noted that the same has been made by way of illustration and not limitation. Accordingly, all modifications, alterations and changes coming within the spirit and scope of the invention as set forth in the appended claims are herein meant to be included.

I claim:

1. A brush wear detector for use in a dynamoelectric machine of the type including a brush holder, a brush assembly including at least one brush element located within said holder and a bias spring in contact with one end of said brush element and operating to bais a second end of said brush element against an electrically conductive member of said machine, said detector comprising:

permanent magnet means, supported by support means external to but associated with said brush element and adapted for movement, as a result of brush element wear, between two positions one of which comprises a selected worn brush position;

switch means, for actuation by said permanent magnet means, located on the brush holder substantially at said worn brush position; and means coupled to said switch means and operable to generate a worn brush signal when said permanent magnet means moves to said worn brush position to actuate said switch means.

2. The brush wear detector as defined by claim 1 wherein said permanent magnet means comprises a two pole magnet supported by said bias spring.

3. The brush wear detector as defined by claim 2 wherein said bias spring comprises a self winding bias spring having one end secured to said brush holder and a coiled portion at the other end which acts to supply a biasing force against said other end of said brush element.

4. The brush wear detector as defined by claim 1 wherein said support means comprises a mounting plate attached to the rear of said brush and a clip member containing said permanent magnet means positionable on said mounting plate.

5. The brush wear detector as defined by claim 4 wherein said clip member comprises an angulated member with said permanent magnet means being located in one outer portion thereof so that a linear translation of said permanent magnet means between said two brush positions is provided to actuate said switch means.

6. The brush wear detector as defined by claim 5 wherein said mounting plate and said clip member include mutually engageable detent means for holding said clip member in position on said mounting plate.

7. The brush wear detector as defined by claim 6 wherein said support means comprises an angulated mounting plate located on the rear end of said brush element and an angulated clip member with said permanent magnet means secured thereto, said permanent magnet means further being comprised of a relatively flat planar two pole magnet located at the outer end of said clip member and having one planar surface facing said switch means.

8. The wear detector as defined by claim 7 wherein said switch means comprises a reed switch.

9. The wear detector as defined by claim 1 wherein said bias spring comprises a self winding spring member having a coil portion applying a biasing force to at least one of said brush members and wherein said permanent magnet means is located within said coil portion of said spring.

10. The brush wear detector as defined by claim 9 and additionally including a spool containing said permanent magnet means located in said coil portion, said spool having a central longitudinal axis generally coaxial with the eye of said coil portion.

11. The brush wear detector as defined by claim 10 and wherein said permanent magnet means comprises a two pole permanent magnet having a pole face directed toward said switch means at said worn brush position.

12. The brush wear detector as defined by claim 11 wherein said switch means comprises a reed switch.

13. The brush wear detector as defined by claim 12 wherein said permanent magnet comprises a generally flat planar magnet generally circular in cross section.

14. The brush wear detector as defined by claim 12 wherein said permanent magnet is centrally located in said spool.

15. The brush wear detector as defined by claim 14 wherein said permanent magnet is generally rectilinear in cross section.

16. The brush wear detector as defined by claim 10 wherein said permanent magnet means comprises a horseshoe magnet located within said spool and having a pair of pole faces directed to said switch means.

17. A brush assembly for a dynamoelectric machine comprising in combination:

a brush holder;

a brush assembly including at least one brush element located within said holder;

a bias spring in contact with one end of said brush element and operating to bias a second end of said brush element against an electrically conductive member of said machine;

permanent magnet means supported by support means external to but associated with said brush assembly and including means for being moved as a result of brush element wear between two brush positions, one of which comprises a selected worn brush position;

switch means, for actuation by said permanent magnet means located on the brush holder substantially at said worn brush position; and means coupled to said switch means and operable to generate a worn brush signal when said permanent magnet means moves to said worn brush position and actuates said switch means.

18. The brush assembly as defined by claim 17 wherein said support means is secured to and movable with said brush element.

19. The brush assembly as defined by claim 17 wherein said permanent magnet is supported by and movable with said bias spring.

20. The brush assembly as defined by claim 17 wherein said biasing spring comprises a self winding spring member having a coil portion applying a biasing force to one end of said brush assembly and wherein said permanent magnet means is located within said coil portion of said spring.

* * * * *